G. M. EATON.
GEAR WHEEL.
APPLICATION FILED FEB. 13, 1917.
1,278,888.
Patented Sept. 17, 1918.
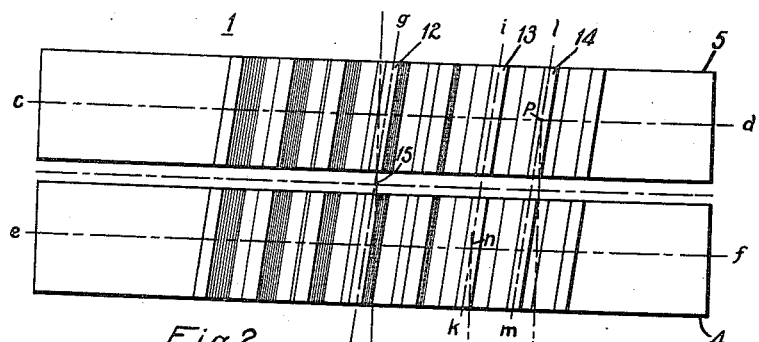
Fig. 2.
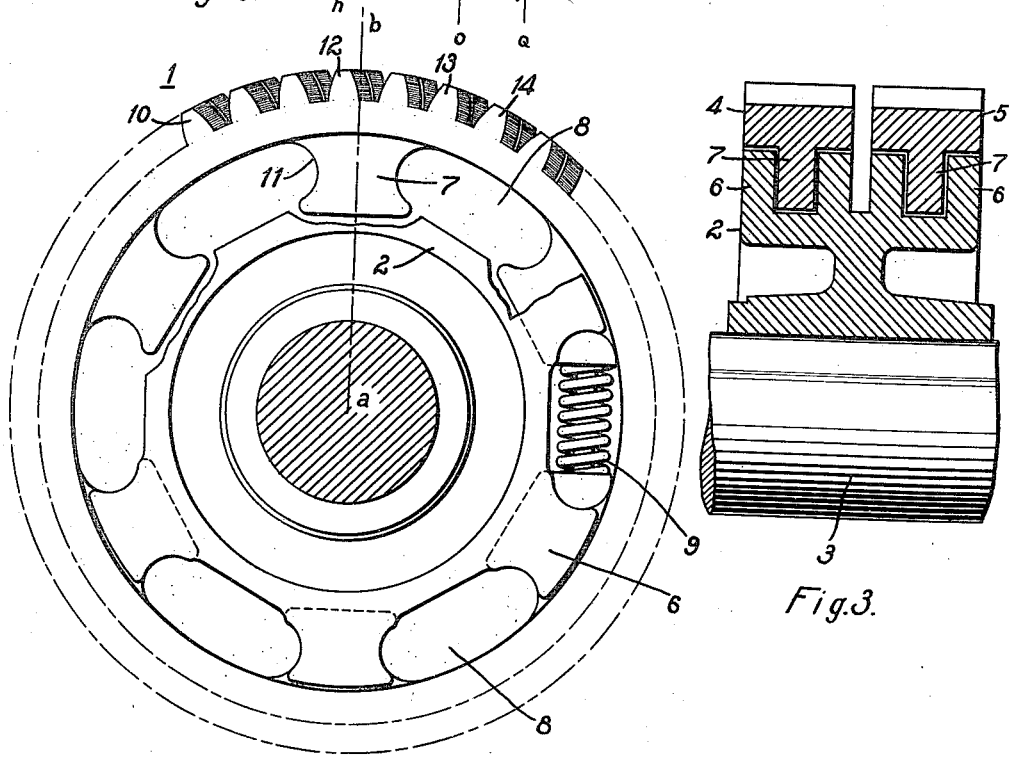
Fig. 1.
Fig. 3.
WITNESSES:
P. J. Fitzgerald.
W. B. Wells.
INVENTOR
George M. Eaton.
BY
Wesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

GEAR-WHEEL.

1,278,888.        Specification of Letters Patent.        Patented Sept. 17, 1918.

Application filed February 13, 1917. Serial No. 148,454.

*To all whom it may concern:*

Be it known that I, GEORGE M. EATON, a citizen of the United States, and a resident of Pittsburgh, in the county of Allegheny and State of Pennsylvania, have invented a new and useful Improvement in Gear-Wheels, of which the following is a specification.

My invention relates to gear wheels and particularly to composite gear wheels which are provided with a plurality of rim members.

One object of my invention is to provide a gear wheel having a hub member and two rim members associated therewith which are provided with helical gear teeth that are so disposed relatively to the means for joining the rim and hub members as to permit the interchanging of the two rim members.

Another object of my invention is to provide a resilient gear wheel having a hub and two rim members, radial projections extending from said members, connectors disposed between said projections for resiliently joining the hub and rim members and helical teeth that are disposed on the rim members relative to the rim projections so as to permit the interchanging of the two rim members.

In helical gear wheels having composite rims, it is essential to have the helical teeth of the rim members constructed in accordance with my invention in order to obtain rim members which are interchangeable. When a gear wheel having a plural number of rim members is constructed without regard to the position of the helical teeth relatively to the means for connecting the hub and rim members together, the teeth formed on each rim member of the gear wheel have a different position relatively to the means for joining the hub and the rim members, thus prohibiting the interchanging of the rim members and making it necessary to carry a large number of separate parts for repairing the gear wheel. Moreover, the first cost of the gear wheel is increased.

In the accompanying drawings, Figure 1 is a side elevational view of a gear wheel constructed in accordance with my invention; Fig. 2 is a plan view of the gear wheel illustrated in Fig. 1, and Fig. 3 is a sectional view of the gear wheel illustrated in Fig. 1.

Referring to the accompanying drawings, a gear wheel 1 embodies a hub member 2, mounted upon a shaft 3, and two rim members 4 and 5. The hub member 2 is provided with radial projections 6, and the rim members 4 and 5 are provided with radial projections 7 which register with the hub projections 6. Between the projections are formed openings 8 through the gear wheel and in which are disposed resilient connectors 9 of a well-known type for resiliently connecting the hub and rim members. For a complete description of the resilient connectors 9 and the relation thereof to the hub and rim members, reference may be had to my pending application, Serial No. 76,601, filed February 7, 1916. The rim members 4 and 5 are preferably provided with helical teeth.

In setting forth the construction of the gear wheel 1, it is assumed that the line $ab$ is a radial line symmetrically located as to a rim projection 11, that the lines $cd$ and $ef$ are respective center lines of the rim members 5 and 4, and that the lines $gh$, $ik$ and $lm$ are the respective center lines of gear teeth 12, 13 and 14. Moreover, the rim members 4 and 5 are assumed to be of the same width and similar in construction so that, if the gear teeth, which are constructed on the periphery of the rim members, have a predetermined relation to the rim projections, the rim members may be interchanged.

Assuming that the teeth of the gear wheel are constructed with a helix angle that does not advance each tooth portion of each rim member the distance between the center lines of two teeth or the circular pitch of the gear wheel, the rim sections may be interchanged, when rotated about a vertical axis through an angle of 180°, if constructed in accordance with my invention.

Referring to Fig. 2 of the drawing and particularly to teeth 13 and 14 which are provided, respectively, with center lines $ik$ and $lm$, the distance which is referred to as the distance each tooth portion of each rim member is advanced by the helix angle along which the teeth are constructed, is indicated by the distance between the lines $no$ and $pq$. The distance between the center lines $cd$ and $ef$ is equivalent to the actual width of a gear rim member plus the clearance which must be allowed between the various rim members. The necessity of considering the clearance to the side of each rim member is made apparent if a gear wheel having more than two rim members is considered.

In gear wheels which are provided with a plural number of rim members, it is essential to provide considerable clearance between the various rim members in order that the burs which form on the ends of the various gear teeth shall not bind the rim members and make the gear wheel operate in a sluggish manner.

A point 15 in the center line of the tooth 12 is determined by determining the point of intersection, on the periphery of the rim members, between a vertical plane including a radial line ab, which is symmetrically disposed relative to the rim projection 11, and the plane perpendicular to the axis of the gear wheel, which is symmetrical to the rim members 4 and 5. Having determined the location of the point 15 and knowing the angle of the helix along which the teeth are to be constructed, the center line of one tooth is determined and, from that center line, the location of all the teeth of the gear wheel is determined.

If it is desired to interchange the rim members 4 and 5, the rim member 4 is rotated through an angle of 180° about a vertical axis to replace rim member 5, and the rim member 5 may be similarly rotated to replace the rim member 4. It will be understood that, since the rim members have helical teeth in which the helix angle is less than the circular pitch, each rim member will have an outer edge face that always faces outwardly regardless of what rim-receiving projections of the hub member it is connected to.

In case the helical teeth of the gear wheel are constructed along an angle which advances each tooth between center lines ef and cd of the rim members 4 and 5 a distance equal to the distance between center lines of two teeth or the circular pitch of the gear wheel, then it is unnecessary to rotate one rim member through 180° in order to replace a complementary rim member, as all rim members are similar in construction and each is symmetrical about a vertical plane passing through the respective center line ef or the center line cd thereof.

In describing the gear wheel illustrated in the drawing, certain axes of symmetry have been chosen in order to make a clear disclosure of the invention. However, it is apparent that other axes of symmetry may be chosen for determining the portions of the teeth on the rim members. For example, the center line of a tooth space may serve in place of the center line of a tooth, and the center line of any spring pocket may serve in place of the center line of any rim projection.

It is essential to have the teeth portions of all rim members disposed along a continuous helix in order that an integral pinion may engage all rim members and be removable from the pinion shaft without removing the shaft from the bearings therefor. In case the teeth of the various rim members were not formed along a continuous helix, the teeth on the pinion and the rim members would lock the pinion against removal if the pinion shaft were in position.

Modifications in the structure and arrangement and location of parts may be made within the spirit and scope of my invention and such modifications are intended to be covered by the appended claims.

I claim as my invention:

1. In a gear wheel, the combination with a hub member, two rim members associated with said hub member, and radial projections extending from said hub and rim members, of means for connecting said projections, and helical gear teeth so disposed on the peripheries of said rim members, relative to the rim projections, as to permit the interchanging of the two rim members.

2. In a gear wheel, the combination with a hub member, two rim members associated therewith, and means for connecting the hub and said rim members together, of helical teeth formed on the peripheries of said rim members, the center lines of said teeth being disposed relative to said connecting means for permitting the interchanging of the two rim members.

3. In a gear wheel, the combination with a hub member, two rim members associated with said hub member, and means, comprising radial projections, extending from the hub and the rim members for connecting said members, of helical teeth formed on said rim members and having the center line of one tooth so disposed relative to a rim projection as to permit the interchanging of the rim members.

4. In a gear wheel, the combination with a hub member, two rim members, and means comprising radial projections extending from the hub and rim members for connecting said members together, of helical teeth formed on the rim members, the center lines of said teeth being so disposed relatively to the rim projections that, in assembled relation, each rim member has an outer edge face that always faces outwardly.

5. In a helical gear wheel, the combination with a hub member, two rim members, and means comprising radial projections extending from the hub and rim members for connecting said members together, of helical teeth formed on said rim members, the center line of one tooth on each rim member extending through a point determined by the intersection of the circular-pitch cylinder, a radial plane symmetrically disposed to the rim projections and parallel to the gear wheel axis and a plane perpendicular to the gear wheel axis and symmetrically disposed with reference to the two rim members.

6. In a flexible gear wheel, the combination with a hub member having radial projections extending therefrom, of two interchangeable rim members having helical teeth formed on the peripheries thereof, and radial projections which register with said hub projections.

7. In a flexible gear wheel, the conmbination with a hub member having radial projections extending therefrom, of two interchangeable rim members having helical teeth formed on the peripheries thereof and radial projections which register with said hub projections, and connectors disposed between said hub and rim projections for resiliently joining the hub and the rim members.

8. In a flexible gear wheel, the combination with a hub member having radial projections, and two rim members having radial projections extending therefrom, said rim projections registering with the hub projections, of helical teeth disposed on the peripheries of the rim members in a position relative to the rim projections for permitting the interchanging of the rim members.

9. In a helical gear wheel, the combination with a hub member having radial projections, two rim members having projections which register with the hub projections, and connectors disposed between the hub and rim projections for resiliently joining the hub and rim members, of helical teeth formed on said rim members, the center line of one tooth on each rim member extending through a point determined by the intersection of the circular-pitch cylinder, of a radial plane symmetrically disposed to the rim projections and parallel to the axis of the gear wheel and a plane perpendicular to the gear wheel axis and symmetrically disposed with reference to the two rim members.

10. In a gear wheel, the combination with a hub member, of two rim members, said hub and rim members having interfitting projections, and means for operatively connecting the rim members to the hub member, said rim members having helical teeth in which the helix angle is less than the circular pitch, and each rim member having an outer edge face that always faces outwardly, regardless of what rim-receiving projections of the hub member it is operatively connected to.

In testimony whereof I have hereunto subscribed my name this 30th day of January, 1917.

GEORGE M. EATON.